United States Patent Office 3,741,878
Patented June 26, 1973

3,741,878
PROCESS AND SYSTEM FOR EXTRACTING SALTS, CONCENTRATED BRINE, AND/OR PURE WATER FROM SALINE WATER
Asriel Osdor, Tel-Aviv-Israel, assignor to Hydro Chemical & Mineral Corp., New York, N.Y.
Continuation of abandoned application Ser. No. 831,087, June 6, 1969. This application May 30, 1972, Ser. No. 258,110
Int. Cl. B01d 1/00, 1/26, 1/28, 3/00, 3/02, 3/34, 7/00
U.S. Cl. 202—173  21 Claims

ABSTRACT OF THE DISCLOSURE

A process of extracting salts, concentrated brine, or pure water from saline water by distillation is characterized by replacing a part of the saline water before distillation with a quantity of an oil, distilling pure water from the mixture through one or more cycles until the saline water reaches a concentration where a substantial quantity or most of the salt precipitates and separating from the mixture the precipitated salt, concentrated brine, and the oil.

This is a continuation of application Ser. No. 831,087, filed June 6, 1969, now abandoned.

BACKGROUND OF THE INVENTION

Field of the invention

The present invention relates to processes and systems for extracting salts, concentrated brine, or pure water from saline water, particularly sea water.

DESCRIPTION OF THE PRIOR ART

At the present time salts are extracted from sea water by the use of solar evaporation pans or ponds, but this is usually an extremely long and expensive procedure, taking many months and years in some localities. The extraction of salts in the course of a water desalination process for the recovery of pure water, has heretofore not been economically feasible because of the large heat investment required to overcome boiling point elevation.

The present invention aims to provide an economically feasible process and systems for the extraction from saline (e.g. sea) water, not only pure water, but also valuable salts or concentrated brine, either as a by-product to a water desalination process thereby lessening the cost for producing the pure water, or as the direct product of the process, the by-product being pure water which may be used or discarded if not required.

In the distillation process for water desalination the final concentration of the blowdown brine (i.e., the residue brine, usually discharged as waste) is obtained by multiplying the feed brine concentration by the ratio of the feed brine quantity to the blowdown brine quantity. For example, assuming that the feed brine concentration is 3.5% solids, and that for every 4,000 kgs. of feed brine, 3,000 kgs. of blowdown brine are produced, the blowdown brine concentration would be 4.67% solids. Heretofore, it has not been economically feasible because of boiling point elevation to push the distillation to a blowdown brine concentration exceeding about 7%, which not only limited the amount of product water that could be recovered from a given quantity of sea water, but also precluded the commercial extraction of salts and concentrated brine from the sea water.

SUMMARY OF THE PRESENT INVENTION

In the method of the present invention, the brine blowdown concentration is increased (e.g. doubled, tripled, etc.) by replacing a part of the feed brine corresponding to a part (one half, two thirds, etc.) of the blowdown brine by an equivalent quantity of an immiscible liquid, e.g., an oil, of different density and lower vapor pressure than water. Thus, when the same quantity of pure water is vaporized from the feed brine, now constituting only a portion of the feed mixture, as would be vaporized from the brine when constituting the complete feed mixture, the concentration of the blowdown brine is increased accordingly. Pure water is distilled from the mixture through one or more cycles until the saline water reaches a concentration where a substantial quantity or most of the salt precipitates, and the precipitated salt, concentrated brine, and immiscible liquid are thereafter separated.

The distillation could conceivably be effected in one distilling cycle, but as will be shown below, great savings in heat investment can be obtained, because of boiling point elevation, when the distillation is effected in a plurality of cycles until the required concentration is reached.

In the preferred embodiment described below, each distilling step is effected in the manner described in patent application Ser. No. 742,865, filed on July 5, 1968. In this case, however, the immiscible liquid instead of product water is reheated in each distilling cycle by flowing down through a series of condensers disposed at decreasing elevation in which condensers water vapor evaporated from the saline water is condensed on the immiscible liquid. The mixture is passed through a series of evaporator stages increasing in elevation and decreasing in temperature and pressure from the first to the last stage, the mixture forming a down-flowing liquid column and a connecting up-flowing boiling mixture column in each evaporator stage and being lifted from one evaporator stage to the next by the difference in pressure between the two stages and the external energy of vaporization in said boiling mixture column.

Further features and advantages of the invention will be apparent from the description below.

The invention is herein described, somewhat diagrammatically and by way of example only, with reference to the accompanying drawings, wherein:

BRIEF DESCRIPTION OF THE DRAWINGS

FIG. 6 illustrates a modification in the apparatus of FIG. 1, FIG. 6a being a sectional view along the lines x—x of FIG. 6, and FIGS. 6b and 6c being variations thereof along the same sectional line;

FIG. 7 illustrates a further modification in the apparatus of FIG. 1, FIG. 7a being an enlarged sectional view along lines y—y thereof; and FIG. 8 illustrates a modification in the form of apparatus of, for example, FIG. 4, FIG. 8a being a sectional view along the lines z—z of FIG. 8.

In the drawings, the paths of the several fluid media are indicated as follows: sea water (or "brine," the term usually applied after the first evaporator stage), by a line of alternate dots and dashes; pure water, by a continuous line; water vapor, by a line of dots; the immiscible fluid (e.g. a liquid hydrocarbon of lower vapor pressure and of different density than water (such as paraffin, Santowax, Mobiltherm, Shell Deodorized Spray Base, Shell Dispersol, or Aroclor, hereinafter called "oil"), by a line of dashes; and salts or solids, by a series of small circles connected together by dashes.

DESCRIPTION OF THE PREFERRED EMBODIMENTS

Figure 1:
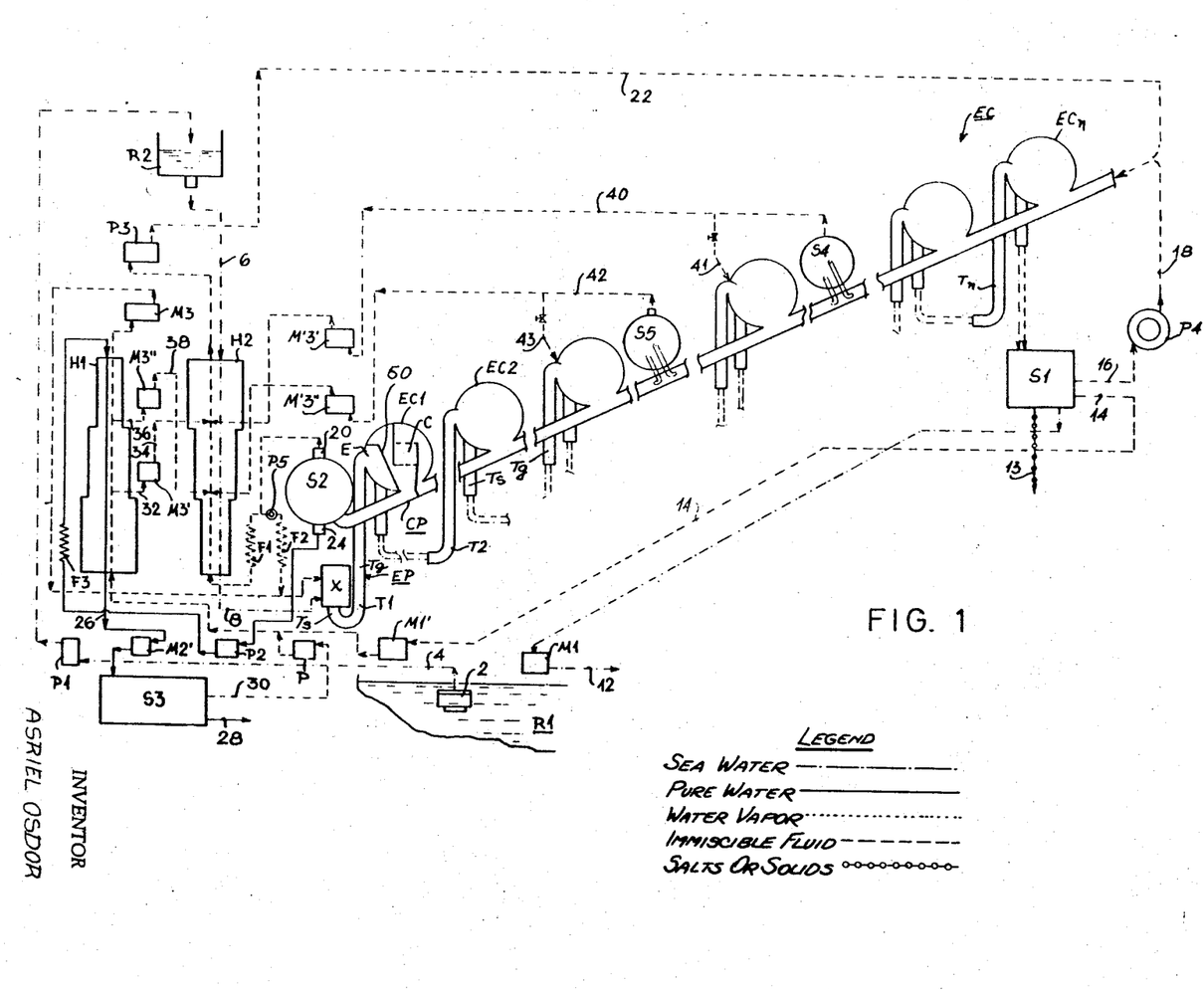
FIG. 1 illustrates one form of multi-stage distillation apparatus and method in accordance with the present invention.

With reference to FIG. 1, the apparatus illustrated is generally designated EC and includes a plurality of double-compartment units EC1, EC2 . . . ECn each forming one stage of the apparatus. Each unit is divided by a partition 50, one compartment of the unit serving as an evaporator E (or more accurately, a liquid-vapor separator, see below), and the other compartment serving as a condenser c. These units are disposed at increasing elevations. The first-stage unit is of highest pressure and temperature, and is disposed at the lowest elevation. The last-stage unit is of lowest pressure and temperature, and is disposed at the highest elevation.

All the evaporators are connected together by an evaporator conduit system, generally designated EP. This conduit system includes a U-tube, T1, T2 . . . Tn, each having a short leg Ts exiting out of the bottom of one evaporator (the mixer X in the first stage), and a longer leg Tg leading into the top of the next higher stage evaporator. The hot sea water, after being mixed with oil, is introduced at the bottom of the evaporator conduit system EP and moves upwardly against gravity through all the evaporator stages in succession in a manner to be more fully described below. A condenser conduit system, including an inclined tube CP, extends downwardly and connects all the condensers together in series. The condensing pure water, also mixed with oil, flows downwardly through the inclined tube CP from one condenser to the next and exits from the bottom.

The apparatus further includes a heat-exchanger H1 in which hot distilled water is used to heat oil, and a second heat-exchanger H2 in which hot oil is used to heat the incoming sea water. These two heat-exchangers may be of the known liquid-liquid direct-contact type, in which up-flowing oil drops come into direct contact with down-flowing saline water in one heat-exchanger, and with fresh water in the other heat-exchanger.

The sea water is drawn from a reservoir R1 and is drawn by pump P1 through filter 2 and pipe 4 to an open reservoir R2 at high elevation. The sea water then flows through pipe 6 into the upper end of heat-exchanger H2 where it is heated by up-flowing hot oil and exits at the bottom through pipe 8 into a mixer X where it is mixed with hot oil. The oil-sea water mixture then passes into the first U-tube T1 of the evaporator conduit system EP into the evaporator E of the first-stage unit EC1, and from there it moves upwardly against gravity through the evaporators of the remaining units EC2, etc., finally through U-tube Tn into the evaporator of the last and highest-stage unit ECn.

The transportation of the brine-oil mixture from one evaporator to the next of higher elevation is effected by means of a self-lift system utilizing the external energy of evaporation and pressure drop to drive it upwardly through the evaporator stages in succession, as will be more fully described below.

The oil-brine mixture exiting from the last-stage evaporator (ECn) at the top of the evaporator conduit system EP passes into a separator S1, wherein the brine is separated from the oil, and salts are separated from the brine and from the oil. The brine exits through pipe 10 and passes through a power generator M1 before it is discharged through pipe 12. The precipitated calcium carbonate and calcium sulfate and a small quantity of other solids are separately removed through pipe 13.

A part of the oil from separator S1 exits through pipe 14 and passes through power generator M1' into the bottom of heat-exchanger H1 where it is heated by down-flowing pure water. It then passes through power generator M3 to mixer X where it is mixed intimately with the incoming hot sea water and the mixture is introduced into the U-tube T1 connected to the evaporator of the first-stage unit EC1. Another part of practically pure cold oil from separator S1 is directed by a valve or pump P4 through pipe 18 into the upper end of the inclined tube CP of the condenser conduit system.

In the condenser conduit system, the oil flows downwardly by gravity through inclined tube CP from one condenser outlet to the next condenser outlet. The flashed water vapor flows from each evaporator into the condenser of the same stage and condenses on the oil. The mixture of pure water and oil thus formed exits at a high temperature at the bottom of the inclined pipe CP into a separator S2. Here, the hot oil is separated from the pure water and exits through outlet 20. One part passes through make-up heater F1 into the bottom of heat-exchanger H2, where it is used to heat the incoming sea water and after purification (if considered necessary or desirable) is pumped by pump P3 through pipe 22 to the top of the condenser conduit system tube CP. The remainder of the hot oil is pumped by pump P5 through a second make-up heater F2 to the mixer X where it is added to the incoming sea water before the latter is introduced into the evaporator of the first stage unit EC1.

The separators may be of a simple and inexpensive type commonly utilized for separating two liquids of different density, or for separating solids suspended in liquids. The separators S1 and S3 may consist essentially of open basins placed at a lower elevation than the last stage evaporator or condenser of the apparatus, the basins including coalescers and filters.

The hot pure water exits from separator S2 through outlet 24, passes through a pump P2 and through a make-up heater F3, and is then introduced into the top of heat-exchanger H1 where it is used to heat up-flowing oil before the latter is introduced into mixer X. The pure water exiting cold from heat-exchanger H1 passes through pipe 26 and through power generator M2' into an oil-water separator S3, where it is separated from entrained oil, and then exists as product water through pipe 28. The separated oil leaves separator S3 through pipe 30 and is pumped by pump P back into the bottom of heat-exchanger H1.

Because the specific heat of the oil changes with a change in temperature, three sub-cycles of oil flow are provided so as to equalize the heat capacity within each of three temperature ranges. Also, each of the heat exchanges H1 and H2 has a different horizontal cross-sectional area for each one of these oil sub-cycles.

The bulk of the oil exits from the upper, smallest-diameter end of heat exchanger H1, at the highest temperature, and passes through power generator M3 to the mixer X for mixing with the hot sea water being introduced into the evaporator conduit system EP as described earlier. Another part of the oil, at a lower temperature, exits through outlet pipe 32 from the lower, wider-diameter end of heat-exchanger H1 and passes through power generator M3' and pipe 34 into the upper, wider-diameter end of heat-exchanger H2. The remainder of the oil at a temperature between the above two, exits through outlet pipe 36 from a higher, smaller-diameter portion of heat exchanger H1, and passes through power generator M3" and pipe 38 into a lower, smaller-diameter portion of heat-exchanger H2.

The oil passing through the condenser conduit system and heated in the condensers is also directed to heat-exchanger H2 through three different paths. The first path, briefly described above, is from separator S2 at the bottom of the condenser conduit system, the oil in this path passing through make-up heater F1 and being introduced into the bottom of heat-exchanger H2. The second path is taken from a separator S4 located at about two-thirds the distance from the bottom of the condenser conduit system, this oil passing through pipe 40 and power generator M'3 into the upper portion of heat-exchanger H2. The third path of the oil is taken from a separator S5 located at about one-third the distance from the bottom of the condenser conduit system, this oil passing through pipe 42 and power generator M'3 into a mid-portion of heat-exchanger H2. Oil from S4 and S5 are supplied to lower level evaporators through pipes 41 and 43.

The operation of the apparatus is briefly as follows and is more fully described in patent application Ser. No. 742,865. The cooling liquid (oil) through the condenser conduit system EC flows downwardly by gravity, whereas the liquid being flashed (sea-water-oil mixture) flowing through the evaporator conduit system EP flows upwardly against gravity utilizing the external energy of evaporation in addition to the difference in pressure between stages for effecting the lift. The described system utilizes very efficiently the external energy of evaporation in that there is formed and maintained in the U-tubes T1, T2, etc., connecting the evaporators: (1) a down-flowing liquid column in short leg T$s$; (2) a longer up-flowing fluid column in longer leg T$g$, which latter column is in the liquid state at its lower end and in the state of a boiling mixture at its upper end; and (3) a hydraulic seal between the two adjacent evaporators formed by the liquid in the bottom of the longer up-flowing column of leg T$g$. The boiling mixture column in the longer leg T$g$ is produced because the difference in height between the top of the longer leg leading into the higher-stage evaporator and the upper level of the down-flowing liquid column exiting from the lower-stage evaporator through the shorter leg T$s$ is greater than the pressure difference in water head between the two stages.

While the units E are referred to as evaporators, it will be appreciated that the apparatus can be, and preferably is, operated such that most or all of the evaporation is effected in the boiling mixture columns of the longer legs T$g$. Thus, the density of the boiling mixture column is decreased, providing more lift of the boiling mixture. This also decreases or eliminates the non-equilibrium allowances existing in the known flash methods, usually assumed to involve about a 2.5° F. loss in the lower temperature stages. Further, since units E would thus function mostly as liquid-vapor separators rather than as evaporators, these units may be made of smaller size.

Further advantages can be pointed out in this method of lift, particularly over the "Clementine" system, described in the Second European Symposium on Fresh Water from the Sea, Athens, May 9–12, 1967 (pp. 36–1 to 36–12), in an article titled "Development of Direct Contact Flash Distillation Concepts," a copy of which article has been deposited in the U.S. Patent Office. This system uses a riser (a vertical pipe increasing in cross-section from bottom to top) connecting two vertically-spaced evaporator stages. The present method utilizes the down-flowing liquid column in leg T$s$, as an additional driving force in increasing the lift in the up-flowing column in leg T$g$. Since the cross-sectional area of the down-flowing liquid column in short leg T$s$ is about the same (at least of the same order of magnitude when compared to the "Clementine" system) as the cross-sectional area of the up-flowing column in longer leg T$g$, the liquid in the down-flowing column moves downwardly at a much higher velocity than in the "Clementine" system where the down-flowing velocity is very small because of the large cross-sectional area in the evaporator chamber, and therefore provides a greater kinetic energy in the down-flowing stream increasing the lift in the up-flowing column. This arrangement also enables the system to automatically regulate itself with variations in the rate of input of the liquid being flashed, since an increase in the rate of input will rapidly produce a bigger head, and therefore the liquid will flow at a higher velocity, whereas in the "Clementine" system an increase in the rate of input will substantially unaffect the head (because of the large evaporator chamber area) and therefore will substantially unaffect the liquid velocity.

Incidentally, basically the same operation can be effected by a well-type manometer arrangement, such as described in the above-identified specification, rather than U-tubes.

A further advantage would appear to be present here where oil is mixed with the flashing brine. As known, where a liquid is heated to the boiling point an additional amount of heat energy must be invested to form the bubbles. This requires heating the liquid above the boiling point. This superheating can be decreased or substantially eliminated by providing nucleating means, i.e., small particles or a rough surface to promote the formation of the bubble configuration. In the present case, where an immiscible liquid is intimately mixed with the brine, it has been observed that the brine is suspended in the immiscible liquid in the form of droplets of such size that they could serve as nucleating means to promote the formation of bubbles. If so, this may reduce or eliminate energy for bubble formation which would have the effect of decreasing or eliminating superheating.

Figure 6:
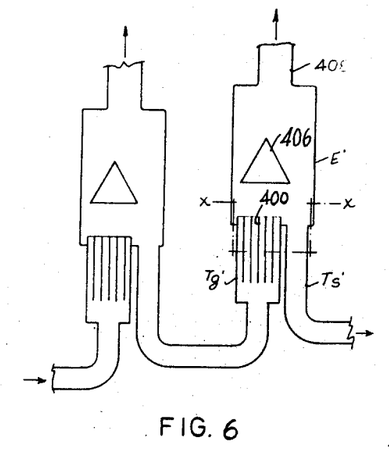
Figure 6A:
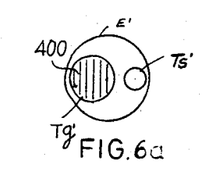
Figure 6B:
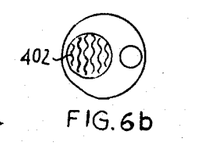
Figure 6C:
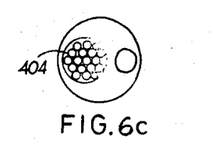
Figures 7, 7A:
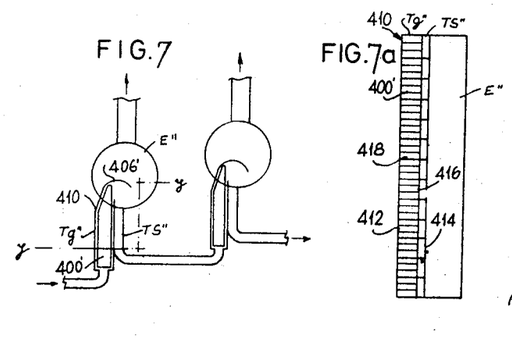

Another possible way of decreasing superheating and increasing lift is shown in FIGS. 6 and 7. It has been observed by repeated experiments that reducing the velocity of the up-flowing liquid in the longer U-tube leg T$g$ produces a boiling-mixture column of great height, i.e. a greater lift, for the same temperature difference ($\Delta$T) between two consecutive stages. A slower up-flow of the liquid in the longer U-tube leg apparently gives more time for the vapor bubbles to form and thus causes the boiling to start at a lower height. This increase in lift is greater for lower flashing temperatures, probably because the superheating and the non-equilibrium allowances are greater at lower flashing temperatures.

The decrease in the up-flow velocity of the liquid can be effected by increasing the cross-sectional area of the up-flowing leg T$g$ of the U-tube below the level where the liquid starts or is expected to start boiling. This increase in the cross-sectional area may be provided only for the lower flashinng temperature stages, or it may be provided gradually for some or all the stages with the increase in cross-sectional area of each stage being inversely related to the flashing temperature of the stage.

Increasing the cross-sectional area also tends to increase the slip of the liquid or of the vapor past the brine, which may cause the boiling mixture column to collapse. Means should therefore be provided to support the up-flowing boiling mixture column.

FIG. 6 illustrates the foregoing wherein it will be seen that the upper part of the longer leg T$g'$ (i.e. beginning just below the level where the liquid is expected to start boiling) is made of increased cross-sectional area when compared to that of the short leg T$s'$. In addition, means are provided within the longer leg T$g'$ for supporting the boiling mixture column against collapse. The latter means are shown in FIGS. 6 and 6$a$ as being a plurality of flat vertical sheets 400 horizontally spaced from each other to provide a plurality of vertical narrow passages within leg T$g'$ for the boiling mixture flow. In FIG. 6$b$, the supporting means are shown as corrugated sheets 402; and in FIG. 6$c$ they are shown as vertical tubes 404 open at both ends. A cover or shroud 406 is provided (FIG. 6) to deflect the brine droplets entering the evaporator E' (or liquid-vapor separator) into the shorter U-tube leg T$s'$, so that substantially only the vapor will pass through outlet 408 to the condensors.

FIGS. 7 and 7$a$ illustrate a further arrangement that may be used. Here, the evaporators E" (or liquid-vapor separators) are in the form of horizontal cylinders, and the longer U-tube leg T$g''$ of one stage is combined in the same unit with the shorter U-tube leg T$s''$ of the next succeeding stage in one unit 410. As shown in the enlarged view of FIG. 7a, unit 410 is rectangular in cross-section, extending the complete length of chamber E", and includes two outer walls 412, 414, and an inner wall 416 dividing the interior of the unit into two passageways, namely one of large cross-sectional area serving as the longer leg Tg" for the up-flowing column into chamber E", and a passageway of smaller cross-sectional area serving as the shorter leg Ts" for the down-flowing liquid exiting from chamber E". A plurality of vertical supporting plates 418 are provided across both passageways for bracing the walls, and in addition a further plurality of vertical sheets 400' are provided only in the passageway of leg Tg" for supporting the boiling mixture column against collapse, sheets 400' serving the function of sheets 400, 402 and tubes 404 in FIGS. 6a–c. In FIG. 7, the liquid drop deflector 406' is shown as semi-cylindrical in shape.

Figure 2:
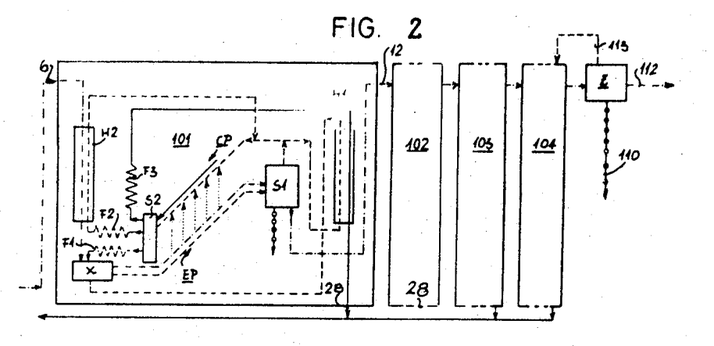
FIG. 2 schematically illustrates the method wherein the feed brine is recycled through a plurality of distillation apparatus for effecting brine concentration and salt-recovery.

In FIG. 2 there is schematically shown a system including a plurality of the apparatus of FIG. 1 each designated 101, 102, 103 and 104, all arranged in tandem. The construction of the apparatus of FIG. 1 is shown schematically and in simplified form in the first apparatus 101, it being understood that the other apparatus 102, 103 and 104 are similarly constructed. From the first apparatus 101, there exits through pipe 28 a quantity of cold product water, and through pipe 12 the residual brine in cold condition. The latter is introduced into the next apparatus 102 where it is fed to heat-exchanger H2 of that apparatus, heated, and mixed with oil in mixer X of that apparatus as described above. Pure product water is withdrawn through pipe 28, and the residual brine is passed to the next apparatus 103. The salt concentration of the brine thus increases as the brine passes from one apparatus to the next, and by the time it exits from the last apparatus 104, its concentration is sufficiently high that the major part of the sodium chloride precipitates and can be economically recovered in a separator, schematically indicated at Z.

For example, for each 4000 kg. sea water containing 3.5% solids entering apparatus 101, there exits 2000 kg. of brine containing 6.7% salts, and 2000 kg. pure water. The brine is heated in heat-exchange H2 of apparatus 102 to 180° C. and is mixed intimately with hot oil in the second apparatus 102. The latter produces 1000 kg.

precipitate at the elevated temperature in the apparatus themselves. These precipitates may easily be separated from the brine exiting from apparatus 101 in open basins before treating the brine in apparatus 102. The greatest portion of the precipitated calcium carbonates and sulfates cling to the oil and may be separated by continuously deviating a part of the circulating cooling oil to open basins, such as separator S1, in a flow sufficiently slow to enable the precipitated solids to settle at the bottom.

Before being introduced into the fourth apparatus 104, the 583 kg. of residual brine is heated to 180° C. and is mixed with the required quantity of oil.

The mixture exiting from the last apparatus 104 is separated in separator Z into the following: crystalline sodium chloride, removed through outlet 110; brine containing all the magnesium salts, the potassium chloride, a small portion of sodium chloride, and practically all the rare elements in the sea water, removed through outlet 112; and purified oil, removed through outlet 113. Separator Z serves the same function as separator S1, except it recovers sodium chloride instead of the carbonates and sulfates, the oil exiting from separator Z following the same paths as that exiting from S1.

The sodium chloride crystals that may settle at the bottom of the evaporators and evaporator conduits could be removed by known mechanical means. One way would be to add vertical or inclined tube legs to the evaporators and to the evaporator conduits and to remove the settled crystals through these legs or from deposit tanks disposed at the bottom of these legs.

The precipitated calcium carbonates and sulfates, and the small quantities of other solids such as iron oxide and impurities, are separated from the brine and the oil in the first, second and third steps. This makes the residue of the fourth step a raw material of great commercial value, which may be used in producing the above chemicals, hydrochloric acid, and/or magnesia of high purity.

Instead of using the residual brine of the third step as the feed liquid in the last step, concentrated solutions may be used, such as the highly concentrated Dead Sea water or industrial brines.

The following table indicates the expected heat investment per 4000 kgs. of sea water when using one or more of the above steps.

TABLE 1

| Steps | Sea water or brine | | Product water (kgs.) | Heat investment (Kcal.) | |
|---|---|---|---|---|---|
| | Weight (kgs.) | Salt (percent) | | Per total product water | Per 1,000 kgs. product water |
| 1st | 4,000 | 3.5 | 2,000 | 30,500 | 15,300 |
| 2d | 2,000 | 6.7 | 1,000 | 19,850 | 19,850 |
| 3d | 1,000 | 13.4 | 417 | 14,300 | 34,300 |
| 4th | 583 | 23.0 | 400 | 21,950 | 54,900 |
| Residual brine | 88 | 44.0 | | | |
| 1+2+3+4 | 4,000 | 3.5 | 3,817 | 86,800 | 22,700 |
| Residual brine | 88 | 44.0 | | | |
| 1+2+3 | 4,000 | 3.5 | 3,417 | 64,650 | 19,000 |
| Residual brine | 583 | 23.0 | | | |
| 1+2 | 4,000 | 3.5 | 3,000 | 50,350 | 16,800 |
| Residual brine | 1,000 | 13.4 | | | |
| 1 | 4,000 | 3.5 | 2,000 | 30,500 | 15,300 |
| Residual brine | 2,000 | 6.7 | | | | pure water and 1000 kg. residual brine containing about 13.4% salt. The 1000 kg. of residual brine is then heated to 180° C. and is mixed with hot oil before it is introduced into the third apparatus 103, from which are produced 417 kg. of pure water and 583 kg. of residual brine containing about 23% salts.

Figure 3:
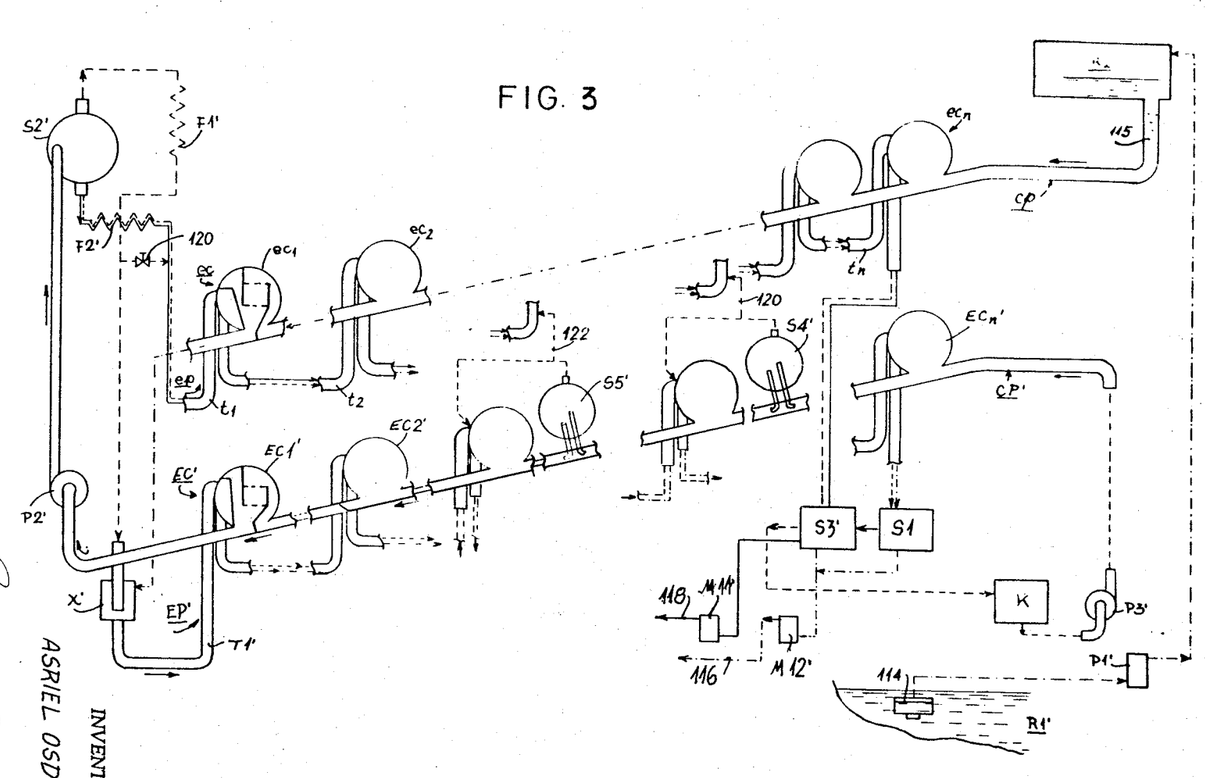
FIG. 3 illustrates a second embodiment of multi-stage distillation apparatus and method in accordance with the present invention.

The above computations of salt concentrations as 6.7%, 13.4% and 23% with reference to the brine exiting from apparatus 101, 102 and 103, respectively, take into consideration the fact that the calcium carbonates and sulfates FIG. 3 illustrates a further embodiment of the invention in which the heat-exchangers H1 and H2 are eliminated, and instead, a secondary distillation apparatus ec, like the first one illustrated in FIG. 1 except of smaller size, is disposed in parallel to the main distillation apparatus EC'. The secondary apparatus is used to heat the incoming sea water by condensing directly thereon vapor flashed from pure water produced in the main apparatus.

The main apparatus EC' includes the plurality of stages, EC1', EC2' . . . ECn', disposed at increasing elevation, with the highest temperature and pressure chambers at the lowest elevation, as in the FIG. 1 apparatus. A mixture of hot sea water and hot oil supplied from mixer X', is introduced into the bottom of the evaporator conduit system EP' and moves from one evaporator to the next one of higher elevation through the connecting U-tubes T1', T2' etc., as in the FIG. 1 embodiment. Also, cold oil is introduced at the top of the inclined pipe CP' of the condenser conduit system, and moves downwardly by gravity from one condenser to the next, picking up heat and pure water, by condensing the vapor coming from the evaporators.

The secondary apparatus ec is of a similar construction and includes a plurality of evaporator-condenser units ec1, ec2 . . . ecn of similar construction but of smaller size than in main apparatus EC', each stage unit being disposed at increasing elevation with the highest temperature and pressure chambers at the lowest elevation. This secondary apparatus also includes a similar evaporator conduit system ep including a U-tube, t1, t2 . . . tn, connecting the evaporator of one stage to that of the next to form a self-lift system. In the secondary apparatus, however, a mixture of hot pure water and oil, rather than of brine and oil, flows through the evaporator conduit system. The pure water in this mixture is diverted from a part of the product water produced in the main distillation apparatus EC'. A part of this pure water is flashed in the evaporators of the secondary apparatus ec and condenses on the sea water flowing downwardly from one condenser to the next of the condenser conduit system in the secondary apparatus. The sea water is heated in this manner in the secondary apparatus before it is applied to the evaporator conduit system of the main apparatus. The hot pure water is cooled by the flashing in the secondary apparatus and the bulk flows out as product water.

More particularly, the sea water from reservoir R1' is pumped through filter 114 by pump P1' to a reservoir R2' at high elevation. The sea water then passes through a pipe 115 to the top of the condenser conduit system cp of the secondary apparatus ec. From there it passes by gravity through the condensers of the secondary apparatus. Its temperature increases by the condensing vapor from the evaporators of that apparatus and its quantity increases, so that the salt percentage decreases. It exits hot at the bottom of the condenser conduit system into a mixer X' where it is intimately mixed with a quantity of hot oil. The hot sea-water-oil mixture is then introduced into the evaporator conduit system EP' of the main distillation apparatus and moves upwardly against gravity from one evaporator to the next in the manner described below with reference to the FIG. 1 embodiment. The brine-oil mixture leaving the main apparatus passes through a separator S1' where the mixture in permitted to settle. The brine, and the interface layer of the oil next to the brine, are passed through power generator M12' and discharged through pipe 116.

The major part of the oil separated from the brine in separator S1' is fed through another S3' to cooler K where it is cooled to 30° C. and is then pumped by pump P3' to the upper end of the condenser conduit system of the main apparatus. It passes downwardly by gravity through the condensers in the manner described above with reference to FIG. 1, exiting at the bottom as a hot mixture of pure water and oil. This mixture is pumped by pump P2' to a separator S2' where the bulk of the hot oil is separated from the hot pure water.

The hot water from separator S2', while still mixed with a part of the hot oil, is heated in make-up heater F2' and introduced into the bottom of the evaporator conduit system ep of the secondary distillation apparatus. This mixture moves upwardly through the evaporators in succession in the same manner as the mixture of brine and oil moves upwardly through the evaporators of the main apparatus (and in the apparatus of FIG. 1). A quantity of the water flashes in each evaporator stage, the vapor condensing on the sea-water passing through the condensers of the secondary apparatus. The pure-water-oil mixture exiting from the top of the evaporator conduit system of the secondary apparatus is then directed to a separator S3'. The separated pure water after being used to cool the oil from separator S1' passes through a power generator M11' and is discharged through pipe 118 as product water.

The oil separated in separator S3' is pumped by pump P3' to the top of the condenser conduit system of the main apparatus EC'.

As described above, a part of the hot oil mixed with the hot pure water in separator S2' remains in the mixture with the pure water as the latter is introduced into the bottom of the evaporator conduit system of the secondary apparatus ec. The bulk of the hot oil exits from separator S2' and passes through a make-up heater F1' and is then directed to mixer X' for mixing with the sea water before the latter is introduced into the evaporator conduit system of the main apparatus EC'. A valve 120 may be provided for controlling the amount of hot oil returned to the mixer X' with respect to the hot oil included in the mixture with the pure water introduced into the evaporator conduit system of the secondary apparatus.

In the apparatus illustrated in FIG. 3, a separator S4' is provided about one-third down from the top of the condenser conduit system in which a part of the oil is separated and fed through pipe 120 into the evaporator conduit system of the secondary apparatus, and a second separator S5' is provided about two-thirds down from the top of the condenser conduit system of the main apparatus for supplying a part of the oil through part 122 to a corresponding stage in the evaporator conduit system of the secondary apparatus. The purpose of this arrangement, as in the FIG. 1 embodiment, is to equalize the heat capacities within separate temperature ranges of the oil-cycles.

Figure 4:
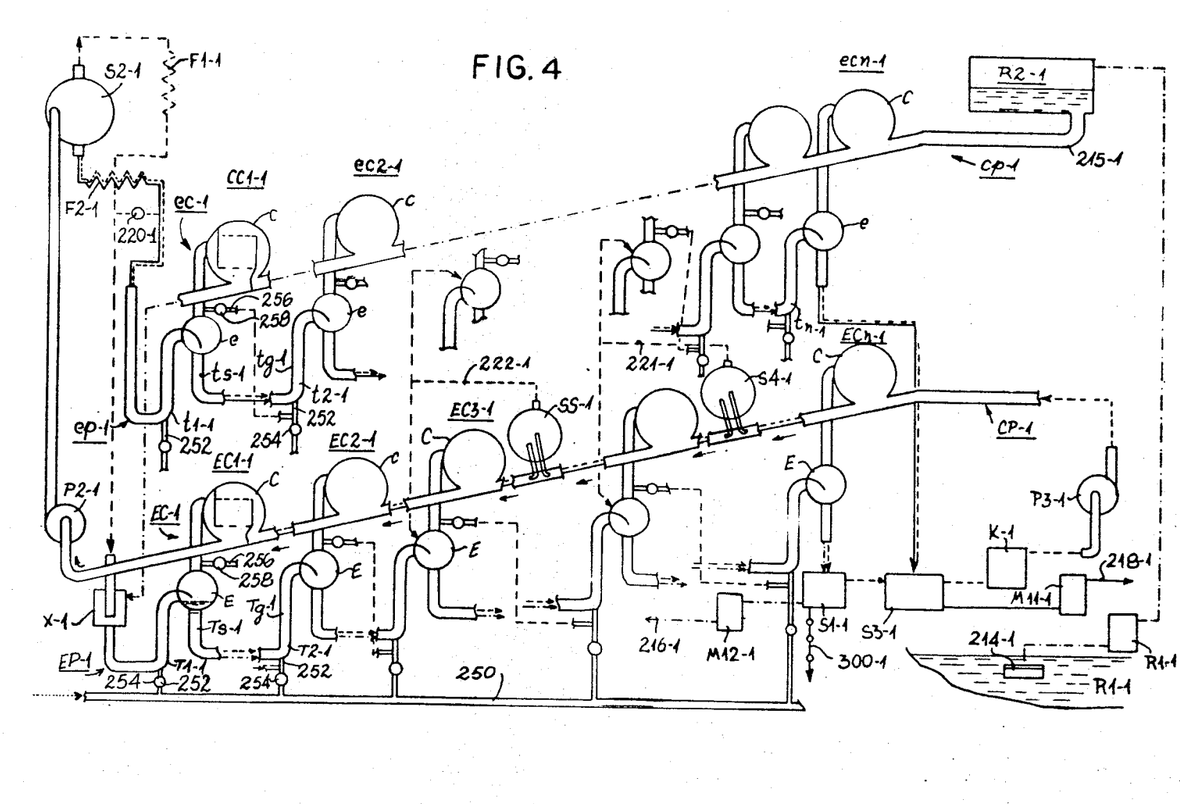
FIG. 4 illustrates another form of apparatus that may be used in practicing the invention.
Figure 5:
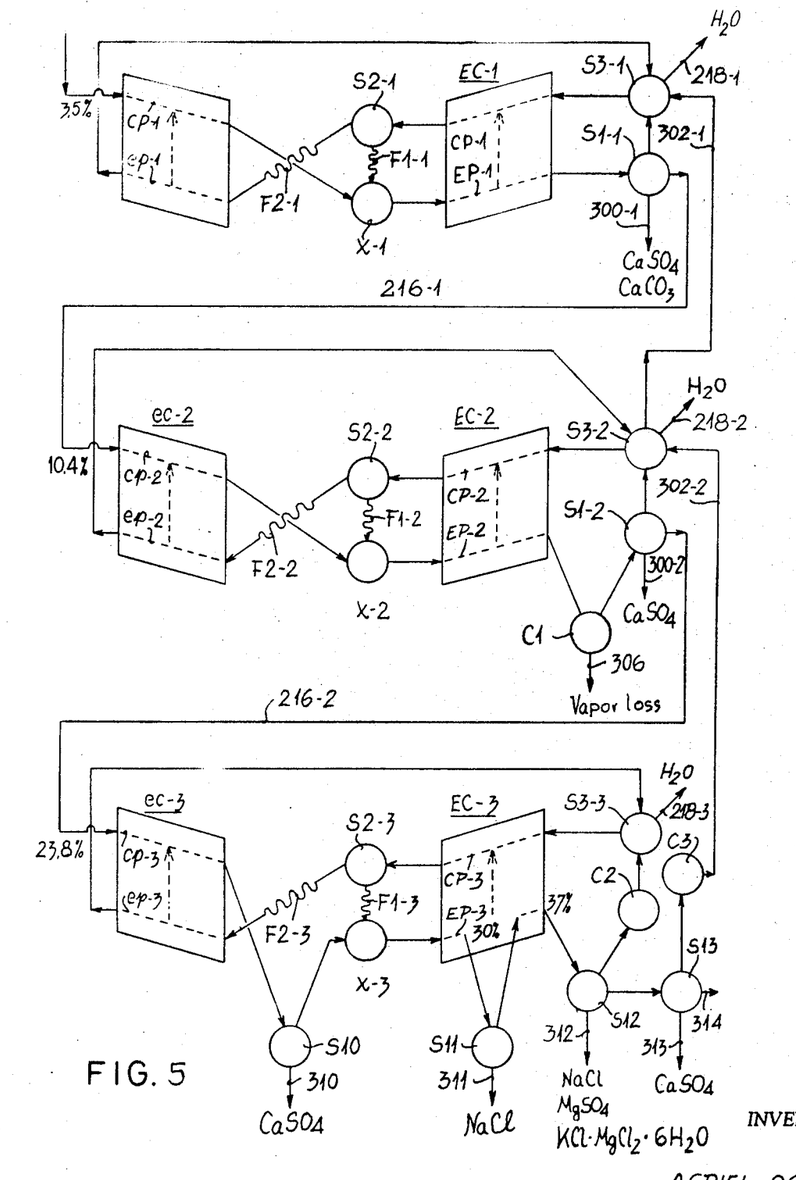
FIG. 5 is a flow diagram illustrating one example of a process in accordance with the invention.

The apparatus illustrated in FIG. 4 is similar to that of FIG. 3 and therefore corresponding parts carry the same reference numerals, except that each numeral is appended with the suffix "—1." In the flow diagram of FIG. 5, three cycles are illustrated. The first cycle uses the apparatus of FIG. 4 its parts being identified with the reference numerals carrying the suffix "—1," while the parts of the second and third cycles, which cycles also use the same apparatus, are identified by reference numerals carrying the suffixes "—2" and "—3," respectively. The invention could of course also be carried out with other apparatus or with more or fewer cycles, even with only one cycle, as described below.

In the apparatus of FIG. 4, however, instead of using a double-compartment unit for each stage, there are used two separate units, namely, an evaporator unit E and e in the main and preheating apparatus, respectively, and a separate condenser unit C and c in the main and preheating apparatus, respectively. In addition a steam supply pipe 250 is connected to the bottom of each of the U-tubes (T1–1, etc; and t1–1, etc.). At the lower ends of the long legs (e.g. Tg–1) and/or short legs (Ts–1, the steam injector in the latter not shown) in the two evaporator conduit systems, for injecting steam into these U-tubes through pipes 252 and valves 254 for starting and control purposes. Additional or alternative control may also be effected by feeding steam from the outlet of the respective evaporators to pipe 252 of the next succeeding stage, or of an even later stage, this injection of the steam being through pipes 256 each controlled by a valve 258.

The flow diagram of FIG. 5 illustrates, solely for purposes of example, a process using the apparatus of FIG. 4 for extracting from sea water, not only pure water, but also valuable salts and concentrated brine. The quantities, temperatures, concentrations, etc. set forth below are based on preliminary calculations for a 10 million gallon per day plant. These figures are of course not necessarily exact and are merely provided to illustrate the principles of the invention. For heat-balance purposes, the quantities are not expressed in absolute units, but rather in "pure water equivalent" units, or "PWE." The PWE of a liquid at a stated temperature is the equivalent quantity of pure water at the stated temperature containing the same heat capacity as that liquid at the stated temperature. Thus, the same quantity expressed in absolute units will usually be a different quantity when expressed in PWE at different temperatures. The PWE figures, particularly of the brine at high temperatures and concentrations, are not necessarily exact because of the lack of available data.

The quantities set forth are in PWE kilograms per hour, for a 10 million gallon per day plant. The following example is computed on the basis of a temperature difference between stages of 1.5° C. It is contemplated that larger temperature differences (e.g. 2.5° C., 3.0° C., 5.0° C. or more) may be used, but the PWE quantities given below will nevertheless remain substantially the same, but the heat input will of course increase with the increase of the temperature difference between stages.

In the first cycle of distillation, the incoming sea water ($1.624 \cdot 10^6$ PWE, 3.5% solids, 20.7° C.) is fed into the top of the condenser conduit $cp$–1 of preheater $ec$–1, and is heated by the vapor condensed thereon (to 178° C.). The heated sea water exiting from $cp$–1 ($2.295 \cdot 10^6$ PWE, 2.6% solids, 178° C.) is fed to mixer X–1 where it is mixed with hot oil ($5.146 \cdot 10^6$ PWE, 180.89° C.), and the mixture at 180° C. is fed into the bottom of evaporator conduit EP–1. A part of the water is flashed, and the remaining mixture (brine $0.56 \cdot 10^6$ PWE, 10.4% salt, 37.0° C., oil $4.900 \cdot 10^6$ PWE) is passed through separator S1–1 where: (1) the precipitated $CaSO_4$ and $CaCO_3$ are removed through outlet 300–1; (2) the major part of the oil ($4.848 \cdot 10^6$ PWE) is separated and passed to separator S3–1 (which also receives the water-oil mixture from the evaporator conduit system $ep$–1 of the preheating apparatus $ec$–1); and (3) the brine with a small quantity of oil ($0.052 \cdot 10^6$ PWE) is fed through outlet 216–1 for the second cycle of distillation. Note: At this point a part of the $CaSO_4$ still remains in the brine, but for purposes of simplification it will be assumed below that all the $CaSO_4$ as well as $CaCO_3$ (total being 2.290 kg./hr., or $0.00064 \cdot 10^6$ PWE) has been separated.

While S3–1 (as well as S3–2 and S3–3 discussed below) are termed separators, they also function as temperature-equalizers.

In preheater $ec$–1, the pure water and oil mixture (water $1.754 \cdot 10^6$ PWE, oil $0.541 \cdot 10^6$ PWE, 180° C.) is introduced at the bottom of the evaporator conduit system $ep$–1. A part of the water is flashed and condenses on the sea water for preheating it as described above, and the remaining mixture (water $1.108 \cdot 10^6$ PWE, oil $0.516 \cdot 10^6$ PWE, 23.2° C.) is fed to separator S3–1. The product water ($1.108 \cdot 10^6$ PWE, 33° C.) is removed through outlet 218–1. Separator S3–1 also receives some oil ($0.052 \cdot 10^6$ PWE, 33° C.) from the succeeding stage through pipe 302–1 which oil is combined with the oil from separator S1–1, and all the oil ($5.416 \cdot 10^6$ PWE, 37° C.) is fed into the top of condenser conduit system CP–1 of the main apparatus. Water vapor flashed from the brine condenses on the oil, and the mixture (water $1.754 \cdot 10^6$ PWE, oil $5.687 \cdot 10^6$ PWE, 177.5° C.) exits from the bottom and is pumped to separator S2–1. From there, a small part of the oil ($0.541 \cdot 10^6$ PWE) mixed with all the water is heated by heater F2–1 (to 180° C.) and is reintroduced into the bottom of $ep$–1, whereas the main part of the oil ($5.144 \cdot 10^6$ PWE) is heated in heater F1–1 (to 180.89° C.) and is fed to mixer X–1 for mixing with the incoming sea water.

Thus, the output from the first cycle ($ec$–1, EC–1) consists of: (1) product water ($1.108 \cdot 10^6$ PWE, 33° C.) removed through outlet 218–1; (2) precipitated $CaSO_4$ and $CaCO_3$, removed through outlet 300–1; and (3) concentrated brine mixed with a small quantity of oil (brine $0.516 \cdot 10^6$ PWE, 10.4% solids, 37° C., oil $0.052 \cdot 10^6$ PWE) removed through line 216–1. The latter is introduced into preheater $cp$–2 of the second cycle ($ec$–2, EC–2) for further concentration.

In the second cycle, the concentrated brine-oil mixture from line 216–1 passes throuh condenser conduit system $cp$–2, exiting at the bottom (brine $0.727 \cdot 10^6$ PWE, 7.9% salt, 178° C., oil $0.055 \cdot 10^6$ PWE) into mixer X–2, where it is mixed with an additional quantity of oil ($1.472 \cdot 10^6$ PWE), and the mixture (brine $0.727 \cdot 10^6$ PWE, oil $1.536 \cdot 10^6$ PWE, 180° C.) is introduced into the bottom of evaporator conduit system EP–2. The mixture (brine $0.192 \cdot 10^6$ PWE, 24% solids, 39.5° C., oil $1.460 \cdot 10^6$ PWE) exiting from the latter is passed to a cooling tower Cl where it is cooled (to 30.4° C.), a small quantity of water ($0.025 \cdot 10^6$ PWE) being evaporated and discarded through outlet 306.

The concentrated brine-oil mixture is then fed to separator S1–2, and the precipitated $CaSO_4$ is removed through outlet 300–2. The remaining brine has a concentration now of 23.8% solids. From separator S1–2, the concentrated brine ($0.167 \cdot 10^6$ PWE) mixed with a small quantity of oil ($0.017 \cdot 10^6$ PWE) is fed through line 216–2 to the third cycle. Most of the oil ($1.443 \cdot 10^6$ PWE, 30.4° C.) is fed to separator S3–2, which separator also receives the water-oil mixture (water $0.320 \cdot 10^6$ PWE, 39.8° C., oil $0.249 \cdot 10^6$ PWE) exiting from the preheater evaporator conduit system $ep$–2, and a small quantity of oil ($0.017 \cdot 10^6$ PWE, 33° C.) from the third cycle through line 302–2.

The outputs from separator S3–2 are: (1) most of the oil ($1.652 \cdot 10^6$ PWE, 33° C.) fed to the top of the condenser conduit system CP–2 of apparatus EC–2; (2) a small quantity of oil ($0.052 \cdot 10^6$ PWE, 33° C.) returned to the first cycle through line 302–1; and (3) the product water ($0.319 \cdot 10^6$ PWE, 33° C.) removed through line 218–2.

The oil fed to the top of CP–2 exits at the bottom mixed with the water condensed thereon (water $0.524 \cdot 10^6$ PWE, 174.5° C., oil $1.735 \cdot 10^6$ PWE) and is fed to separator S2–2, from where a part of the oil ($1.472 \cdot 10^6$ PWE) is heated by heater F1–2 (to 181° C.) and fed to mixer X–2, while the water and remaining oil mixture is heated by heater F2–2 and fed (water $0.524 \cdot 10^6$ PWE, 180° C., oil $0.263 \cdot 10^6$ PWE) into the bottom of preheater $ec$–2 of evaporating conduit system $ep$–2, the latter exiting (water $0.319 \cdot 10^6$ PWE, oil $0.249 \cdot 10^6$ PWE, 39.8° C.) into separator S3–2.

Thus, the output from the second cycle ($ec$–2, EC–2) consists of (1) product water ($0.319 \cdot 10^6$ PWE, 33° C.) removed through outlet 218–2; (2) precipitated $CaSO_4$ removed through outlet 300–2; and (3) a concentrated brine mixed with a small quantity of oil (brine $0.169 \cdot 10^6$ PWE, 23.8% solids, oil $0.017 \cdot 10^6$ PWE, 30.40 C.) removed through outlet 216–2. The latter is introduced into preheater $cp$–3 of the third cycle for further concentration. At this point, all of the $CaCO_3$, the solid impurities in the sea water, and part of the $CaSO_4$ have been removed, the remaining $CaSO_4$ being in super-saturated solution, and substantially all the NaCl and other salts being in solution.

In the third cycle, the concentrated brine-oil mixture from line 216–2 passes through condenser conduit system $cp$–3, exiting at the bottom (brine $0.239 \cdot 10^6$ PWE, 20% salts, oil $0.018 \cdot 10^6$ PWE, 180° C.), and passing first into a separator S10, if required, where the $CaSO_4$ is removed through outlet 310, and then into mixer X–3 where it is mixed with an additional quantity of oil (brine $0.239 \cdot 10^6$ PWE, oil $0.903 \cdot 10^6$ PWE, 180° C.) before being introduced into the bottom of evaporator conduit system EP–3.

The mixture is passed only through a part of the evaporator conduit system until the brine concentration reaches 30%. When this point is reached most of the NaCl is precipitated; also part of the $CaSO_4$ that remained after separator S10 goes into a fine suspension. The mixture is then fed to separator S11 where the precipitated NaCl is removed through outlet 311, and the separated liquid (including the fine CaSO$_4$ suspension) is then returned to evaporator conduit system EP-3 where the brine concentration is raised to 37%, at 57° C. At this concentration, the following salts precipitate: the remaining NaCl; part of the MgSO$_4$; and most of the KCl together with a part of the MgCl$_2$, in the form of carnallite.

Part of the CaSO$_4$ is still in fine suspension, with the remaining CaSO$_4$ in super-saturated solution. The liquid is then fed into separator S12 where the foregoing precipitated salts are removed through outlet 312, and most of the oil is separated and fed to a cooler C2. The remaining liquid mixture (including the CaSO$_4$ suspension) from separator S12 is fed to a further separator S13 which preferably is in the form of an open settling tank. Here the mixture is permitted to stand to give the super-saturated CaSO$_4$ time to precipitate and to settle together with the suspended CaSO$_4$. The latter are removed through outlet 313; the oil is separated and passed to cooler C3; and the resulting concentrated brine is removed through outlet 314.

The NaCl, which is substantially pure, and the concentrated brine, are both products of commercial value.

The oil (0.860·10$^6$ PWE, 57° C.) from separator S12 is cooled in cooler C2 to 46.3° C. and is then fed to separator S3-3. The oil (0.017·10$^6$ PWE, 57° C.) from separator S13 is cooled in cooler C3 to 33° C. and is then fed by line 302-2 to separator S3-2 of the second cycle.

Separator S3-3 of the third cycle receives, in addition to the cooled oil from cooler C2, also the water-oil mixture exiting from the top of preheater evaporator conduit system ep-3 (water 0.150·10$^6$ PWE, oil 0.036·10$^6$ PWE, 33.2° C.). The product water is removed through outlet 218-3, while the oil (0.876·10$^6$ PWE, 44° C.) is fed into the top of the condenser conduit system CP-3, exiting mixed with condensed water (water 0.221·10$^6$ PWE, oil 0.920·10$^6$ PWE, 168° C.) into separator S2-3. Part of the oil is heated (from 168° C.–180° C.) by heater F1-3 and is mixed in mixer X-3 with the incoming brine before being introduced into the bottom of EP-3, while the remainder of the oil, together with the mixed water, is heated by heater F2-3 (to 180° C.) before being introduced into the bottom of ep-3.

Following are several examples of commercially-available oils that may be used as the inert immiscible liquid: Shell Dispersol, Shell Spray Base, Mobiltherm Light, Mobiltherm 600, or Aroclor.

Table I below summarizes the above-described example with respect to a 10-million-gallon-per-day, 3-cycle plant:

TABLE 2

| Cycle | Location | Temp., °C. | Brine PWE (10$^6$) | Conc., percent | Water PWE (10$^6$) | Oil PWE (10$^6$) | Total PWE (10$^6$) |
|---|---|---|---|---|---|---|---|
| 1st | ec-1 | | | | | | |
| | cp-1 (in) | 20.7 | 1.624 | 3.5 | | | 1.624 |
| | ep-1 (out) | 23.2 | | | 1.108 | 0.516 | 1.624 |
| | ep-1 (out) | 178 | 2.295 | 2.6 | | | 2.295 |
| | ep-1 (in) | 180 | | | 1.754 | 0.549 | 2.295 |
| | EC-1 | | | | | | |
| | EP-1 (in) | 180 | 2.295 | 2.6 | | 5.146 | 7.441 |
| | CP-1 (out) | 177.5 | | | 1.754 | 5.687 | 7.441 |
| | EP-1 (out) | 37 | 0.516 | 10.4 | | 4.900 | 5.416 |
| | CP-1 (in) | 33 | | | | 5.416 | 5.416 |
| 2d | ec-2 | | | | | | |
| | ep-2 (in) | 37 | 0.516 | 10.4 | | 0.052 | 0.568 |
| | ep-2 (out) | 39.75 | | | 0.319 | 0.249 | 0.568 |
| | cp-2 (out) | 178 | 0.727 | 7.9 | | 0.055 | 0.782 |
| | ep-2 (in) | 180 | | | 0.524 | 0.263 | 0.787 |
| | EC-2 | | | | | | |
| | EP-2 (in) | 180 | 0.727 | 7.9 | | 1.532 | 2.259 |
| | CP-2 (out) | 174.5 | | | 0.524 | 1.735 | 2.259 |
| | EP-2 (out) | 39.5 | 0.092 | 2.4 | | 1.460 | 1.552 |
| | CP-2 (in) | 33 | | | | 1.652 | 1.652 |
| | | | Vapor loss | | | | |
| 3d | ec-3 | | | | | | |
| | cp-3 (in) | 30.35 | 0.167 | 26.5 | | 0.017 | 0.184 |
| | ep-3 (out) | 33.2 | | | 0.150 | 0.034 | 0.184 |
| | cp-3 (out) | 178 | 0.239 | 20 | 0.221 | 0.018 | 0.257 |
| | ep-3 (in) | 180 | | | 0.221 | 0.036 | 0.257 |
| | EC-3 | | | | | | |
| | EP-3 (in) | 180 | 0.239 | 20 | | 0.903 | 1.142 |
| | CP-3 (out) | 168 | | | 0.221 | 0.921 | 1.142 |
| | EP-3 (middle) | NaCl Separation | | 30 | | | |
| | EP-3 (out) | 57 | 0.017 | 37 | | 0.860 | 0.877 |
| | CP-3 (in) | 44 | | | | 0.877 | 0.877 |

The following indicates the heat required per 1000 kg. product water for each of the three cycles:

First cycle.—Water production—1.108·10$^6$ kg./hr.

Heat input:
Brine ... 2.295·10$^6$·(180–178° C.)=4.590·10$^6$ Kcal.
Water ... 1.754·10$^6$·(180–177.5° C.)=4.385.
Oil ..... 5.687·10$^6$·(180–177.5° C.)=14.218.
Total ................ =23.193·10$^6$ Kcal.

Heat required per 1000 kg. product water=20,900 Kcal.

Second cycle.—Water production 0.319·10$^6$ kg./hr.

Heat input:
Brine ... 0.727·10$^6$·(180–178° C.)=1.454·10$^6$ Kcal.
Oil ..... 0.055·10$^6$·(180–178° C.)=0.110.
Water ... 0.524·10$^6$·(180–174.5° C.)=2.888.
Oil ..... 1.735·10$^6$·(180–174.5° C.)=9.543.
Total ................ =13.995·10$^6$ Kcal.

Heat required per 1000 kg. product water=43,900 Kcal.

Third cycle.—Water production 0.150·10$^6$ kg./hr.

Heat input:
Brine ... 0.239·10$^6$·(180–178° C.)=0.478·10$^6$ Kcal.
Oil ..... 0.018·10$^6$·(180–178° C.)=0.036.
Water .. 0.221·10$^6$·(180–168° C.)=2.652.
Oil ..... 0.920·10$^6$·(180–168° C.)=11.040.
Total ................ =14.206·10$^6$ Kcal.

Heat required per 1000 kg. product water=94,700 Kcal.

Thus in the 3-cycle plant described above, where the salts, concentrated brine, as well as pure water are recovered, the heat required per 1000 kg. product water produced would be approximately 33,000 Kcal.

It will be appreciated that the invention could be practiced with a greater or smaller number of cycles. The smaller the number of cycles, the greater would be the heat required per 1000 kg. product water because of the boiling point elevation resulting from the greater concentration of the blowdown brine. It is even possible to practice the process in one cycle, but the heat required per 1000 kg. product water would be approximately the same as that of the third cycle above, i.e. about 95,000 Kcal., as compared to 33,000 Kcal. for a 3-cycle plant.

The following table indicates the probable combination of salts in sea water having a concentration of about 3.5% solids, and further indicates in more detail the salts that may be recovered and the recovery rate thereof:

of an oil-saline water-brine mixture, in which the oil may form the major portion, is the realization and maintenance of intimate and continuous mixing of the two liquids throughout the entire process so that the saline or brine droplets cooled upon flashing will be dispersed more or less evenly throughout the immiscible liquid and in steady motion with the flowing oil to assure continuous heat transfer and flashing of the droplets.

TABLE 3

| | Seawater solids composition | | | | For 10 million g.p.d. product water | | | |
|---|---|---|---|---|---|---|---|---|
| | | | | | Recovery Step No. 2 | | Recovery Step No. 1 | |
| | Seawater solids, p.p.m. | Seawater solids, dry basis, percent | Dissolved solids, kg./hr. | Dissolved solids after CaSO₄, SrSO₄ and CaCO₃ removal, kg./hr. | Brine after solid NaCl salt removal, kg./hr. | Brine at 30% solids (approx. 31 Be.), percent | Brine at 37.1% (approx. 40 Be.) kg./hr. | Brine at 37.1% (approx. 40 Be.), percent |
| Item: | | | | | | | | |
| NaCl | 26,840 | 77.90 | 45,960 | 45,960 | 5,560 | 10.22 | 45 | 0.40 |
| MgCl₂ | 3,170 | 9.20 | 5,430 | 5,430 | 5,430 | 10.00 | 3,660 | 32.97 |
| MgSO₄ | 2,300 | 6.66 | 3,930 | 3,930 | 3,930 | 7.22 | 245 | 2.20 |
| KCl | 725 | 2.10 | 1,240 | 1,240 | 1,240 | 2.28 | 20 | 0.18 |
| NaBr | 85 | 0.25 | 150 | 150 | 150 | 0.28 | 150 | 1.35 |
| CaSO₄ | 1,200 | 3.48 | 2,050 | | | | | |
| SrSO₄ | 27 | 0.08 | 47 | | | | | |
| CaCO₃ | 116 | 0.33 | 193 | | | | | |
| Total | 34,463 | 100.00 | 59,000 | 56,710 | 16,310 | 30.00 | 4,120 | 37.10 |
| Water | | | | | 38,060 | 70.00 | 7,000 | 62.90 |
| Brine | | | | | 54,370 | 100.00 | 11,120 | 100.00 |
| Solid salts produced: | | | | | | | | |
| Salt—NaCl | | | | | 40,400 | | | |
| Salt mixture: | | | | | | | | |
| NaCl | | | | | | | 5,515 | |
| MgCl₂ | | | | | | | 1,770 | |
| MgSO₄ | | | | | | | 3,685 | |
| KCl | | | | | | | 1,220 | |
| NaBr | | | | | | | (¹) | |

¹ Accounted for in the brine.

To reduce the overall height required for a system having a large number of stages, the evaporators and condensers could be arranged in a plurality of banks, the first stage of each bank starting out at the same lowest elevation, and the last stage of each bank ending at the same highest elevation, for example as described on page 130 of the book "Principles of Desalination," published 1966, edited by K. S. Spiegler, Academic Press, New York and London, publishers.

Also, some of the stages, for example, the low temperature stages, could be located at the same elevation with respect to adjacent stages or at lower elevations from stage to stage, all the time maintaining conditions of decreasing temperatures and pressures throughout the stages from the first to the last.

Figures 8, 8A:
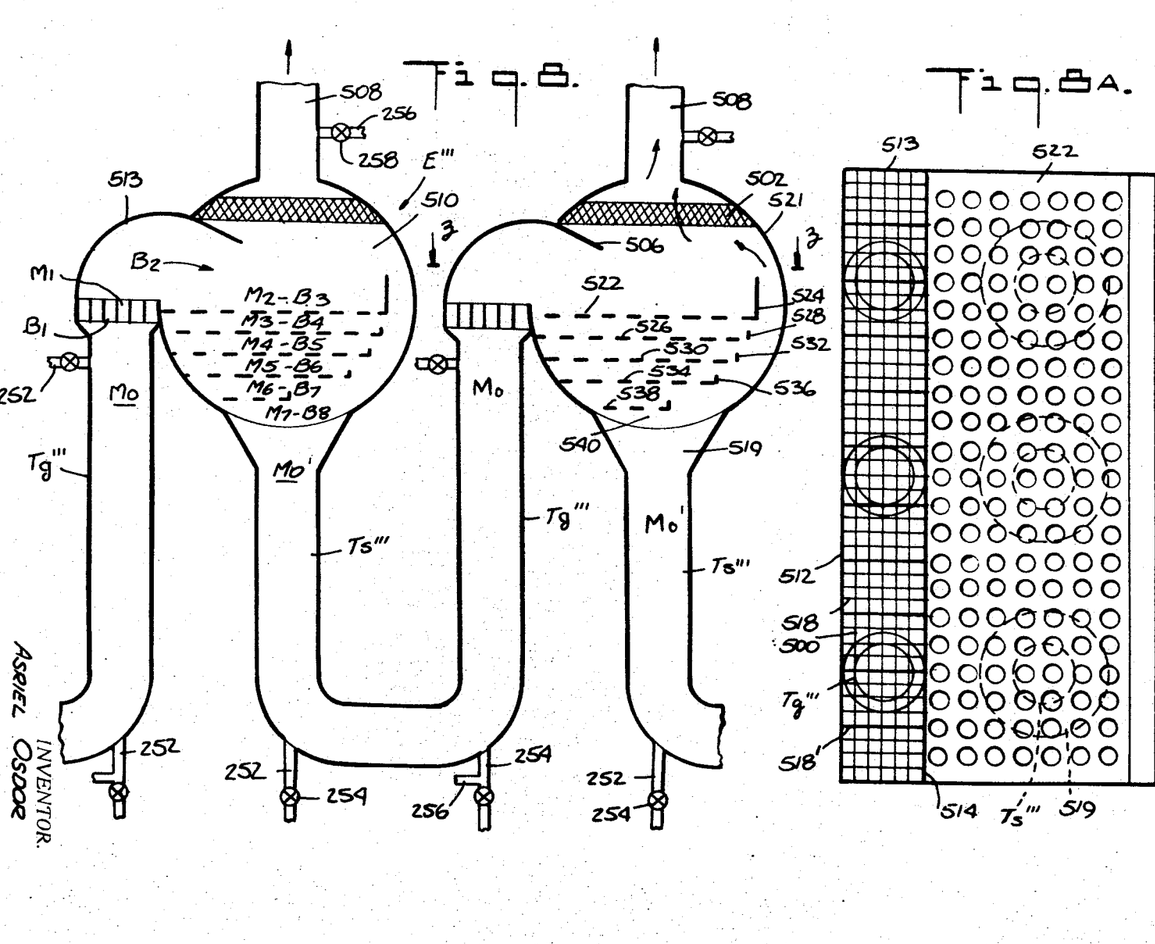

The following discussion of a modified evaporator, generally identified by the designation E''' in FIGS. 8 and 8a is presented in accordance with the previous discussion that the individual stages may be, for lower temperatures, at the same level.

The evaporator E''' may be one of a series of evaporators, the total number being left to choice, and is suitable for use with, for example, the system as illustrated in FIG. 4. Because of general overall similarity between the now to be discussed modification and the modifications of evaporators as shown in FIGS. 6 and 7 as well as the overall correspondence, referring to the valve and conduit structure of FIGS. 4 and 8, certain structure will carry numerical designations heretofore employed in the description and drawing figures.

In view of the foregoing, the following discussion will not be overburdened with repetitious description and the reader is invited to refer to the previous discussion in relation to this similar structure.

As previously brought out, a condition for satisfactory flashing of the saline droplets in the first stage or the brine droplets in following stages, and all forming a part The modification of the invention, now to be discussed, assures that this condition is met.

The evaporators E''' (also hereinafter considered to be liquid-vapor separators) are of cylindrical construction. This is clearly seen in FIG. 8a, representing a horizontal sectional view along the line z—z in FIG. 8. The evaporators, forming a series of stages or units 510 (generally of greater number than the two evaporators shown in FIG. 8) in which successive stages are at lower temperature and pressure, are shown in substantially equal elevation throughout the series. Whereas the several stages in each of the systems of FIGS. 1, 3 and 4 are shown in locations of increasing elevation, it is found that the stages, and particularly the low temperature stages, can be at the same relative elevation or at lower relative elevations from stage to stage with decreasing temperatures and pressures.

The several stages are connected by a U-tube conduit system including a leg Tg''' and a leg Ts'''. Each leg Tg''' and Ts''' and the connecting branch is generally of uniform cross-section throughout their length. The length of leg Tg''' in relation to the length of leg Ts''' will be dependent upon the relative positioning of adjacent evaporators to be connected by the conduit system. In FIG. 8 the leg Tg''' is longer than is leg Ts'''. However, if the right hand evaporator were at a lower elevation, as is possible in the overall system, the leg Tg''' may well be shorter or equal to the length of leg Ts'''.

Referring to FIG. 8a, it is clear that a plurality of U-tube conduit systems, in this case three, may be employed in connecting one evaporator stage to the next of successive stage throughout the system. The number of such U-tube conduits is determined by choice and since each of the several conduits are similarly constructed, only the conduit shown in the elevation view of FIG. 8 will be discussed.

The upper portion of leg $Tg'''$ is shown to be outwardly conical in shape with the base or larger portion in communication with the bottom surface of an enlarged rectangular enclosure formed by the walls 512 and 514 as well as the side walls 513. The walls 513, referring to FIG. 8, extend above the walls 512 and 514 and are generally complementary to the shape of the extension of the plate 506 within the evaporator chamber and the chamber wall. The upper portion of leg $Tg'''$ may also communicate directly with the rectangular enclosure.

The upper portion of leg $Ts'''$, the portion in direct communication with the evaporator chamber, is similarly conical in shape, at 519, thereby to funnel the down-flowing mixture from the chamber.

The rectangular upper portion of the leg $Tg'''$ (see FIG. 8a) extends the length of the evaporator chamber to be in communication with the chamber throughout its length. Fluid communication is provided in the region adjacent the top of the evaporator chamber. The plate 506 serves to deflect the boiling mixture into the evaporator chamber and on to the top of plate 522 of a series of stacked plates. In this manner, the boiling mixture is prevented from passing through the demister 502.

The rectangular portion within the upper leg $Tg'''$ may be of any particular height; however, it should be of a height and begin at a level thereby to assure that boiling of the mixture will take place within its confines. In this connection, the lower region of the increased area portion will be below the height at which boiling is expected to commence.

For reasons discussed, the greater cross-sectional area of the upper leg $Tg'''$ effectively reduces the velocity of the flowing mixture and consequently produces a higher boiling mixture column or greater drive or lift of the mixture for the same temperature and pressure difference between successive stages. Such an area of increased cross-section is especially effective in combination with those evaporator stages at lower temperatures than, for example, some of the initial stages. In stages of higher temperature the cross-section need not be increased.

While drive or lift is provided by the increase in cross-section, the increase causes or tends to cause collapse in the column. To overcome the tendency of the mixture column to collapse, the upper leg includes a grid network, the upper surface of which is at approximately the level of the inlet opening of the evaporator chamber. The grid is formed by a series of spaced sheets 518 and a second series of spaced sheets 500 disposed in perpendicular arrangement to the first. Certain of the sheets 518' in the first series are of increased thickness thereby to aid in supporting the increased cross-sectional area of leg $Tg'''$.

The grid is located slightly above the pipe portion of leg $Tg'''$, being separated therefrom by the conical area, to allow the mixture to spread within the increased area and rise within the several individual rectangular conduits formed by the grid. If, however, the pipe $Tg'''$ is in direct connection with the rectangular area the grid, for the same purpose, will be positioned above the base.

In the present embodiment, the intimately mixed oil and saline water or brine (represented by the identifying symbols $M_0, M_1 \ldots M_{n-1}, M_0$ throughout successive movements of the mixture in transit through the individual evaporator stages and conduits) is driven up and through the leg $Tg'''$, through the evaporator $E'''$ of one stage by gravity fall and into the outflow leg $Ts'''$ whereupon the passage continues in each following stage at relatively lower temperatures and pressures.

Within the increased cross-sectional area of leg $Tg'''$, the mixture will boil, as is the case during gravity fall through the perforated plates within the chamber, as will be more fully discussed. The locations of boiling are represented by the identifying symbols $B_1, B_2, \ldots B_n$. The total sequence may be considered as passing the mixture, boiling the same, remixing, reboiling, etc. and may be considered, symbolwise, as $M_0, B_1, M_1, B_2, M_2, B_3 \ldots$ $M_{n-1}, B_N, M_0$. This is shown in FIG. 8, wherein $M_0$ represents the mixed liquids including saline water droplets dispersed within an immiscible liquid having a vapor pressure lower than that of the water. Further, it is to be understood that between mixing and boiling and the consequent vaporization of a portion of the saline water droplets the unvaporized portion of the droplets, of a temperature now less than the temperature of the droplet before flashing, in order to reflash, must increase in temperature. Temperature increase of the droplets is accomplished by the mixing movement of the unvaporized and cooled droplets to a position at which heat transfer from the hotter immiscible liquid will occur. Upon temperature increase of the droplets, flashing will continue to be followed by mixing and heat transfer until the temperature of the immiscible liquid approaches substantially the temperature corresponding to the saline water vapor pressure in the particular pressure region. This heat transfer step is continuous but not illustrated by symbol.

The boiling brine at $B_2$ in the brine-oil mixture is deflected by the plate 506 and falls upon the plate 522. Plate 522 is supported by the inner wall of the evaporator chamber and rim 524 carried by the chamber in any suitable manner. The plate is provided with a plurality of uniformly spaced perforations for passage of the mixture. Lower plates 526, 530, 534 and 538 are similarly supported by the inner wall and rims 528, 532, 536 and 540. Likewise, each of the lower plates include a plurality of uniformly spaced perforations that, in relation to adjacent plates, are out of alignment in the vertical direction thereby to cause the mixture to follow a serpentine path during which additional mixing and boiling occurs. The process of mixing, boiling, remixing, reboiling, etc., together with heat transfer takes place as the liquid flows onto and through each succeeding plate from the plate 522 to the plate 538 for collection of the mixture at the funnel 519 and passage through downflowing leg $Ts'''$. At the collection point the boiling phase of the process is, for all intents and purposes, terminated, and the liquids enter the leg $Ts'''$ for transport in the mixed condition $M_0$. In this connection, a mixed liquid column will, in steady state, form in leg $Ts'''$ to form an hydraulic seal between the successive evaporator stages which, as indicated, are at different internal pressures. It is important that the liquid column within the leg $Ts'''$ be in an unboiling or substantially unboiling condition. Otherwise liquid hold-up at the entrance to the column $Ts'''$ will occur. Hold-up is obviated or materially eliminated by the increase in cross-section at the funnel part of leg $Ts'''$ without internal support as provided for the column by the leg $Tg'''$ grid. Any boiling that occurs in this area will cease in accompaniment with column collapse.

With further regard to the rims 524, 528, etc., it may be apparent that they prevent excessive quantities of the mixture from flowing within the area between the rims and the right internal side (as in FIG. 8) of the evaporator chamber reserved for water-vapor flow. In this connection, the rims are of a height to allow passage of free water-vapor which then rises as per arrow 521 toward the vapor outlet. But because of plate placement some liquid will be in the area.

It has been found in practice that good results are obtained, i.e., practicable vapor formation and collection at the outlet by providing a group of plates 522, 526, etc., within an area of from approximately ¼ to about ¾ of the total height of the evaporator chamber $E'''$.

In the present form vaporization may take place in leg $Tg'''$ and/or within the evaporator chamber because of the several plates upon which the water droplets mix and boil, mixing being caused by intercepting the gravitational flow. With continuous mixing and movement of the droplets to new locations to gain heat upon heat transfer from the hotter immiscible liquid, the flashing continues due to an accompanying gravitational fall of the mixture past the plates. Thus, the efficiency of the system is increased by the increased formation of vapor.

While a series of plates 522, 526, etc., are shown in horizontal arrangement containing a multiplicity of perforations, it is also to be pointed out that the plates could be slanted relative to one another and contain baffles or the equivalent on the surfaces hereby to provide the necessary continuous mixing of the liquids. Thus, the flow would continue back and forth in a waterfall effect under the forces of gravity and by means of baffle mixing, heat transfer, flashing, mixing, etc., flashing would be accomplished within the area of the plates.

Vapor from the boiling mixture, as represented by the upwardly directed arrows, exits the evaporator E''', after passage through demister 502, by conduit 508. As shown in FIG. 4, the conduit is suitably connected to a condenser in which and by, for example, methods described the pure water vapor is condensed.

As was previously discussed in relation to FIG. 4, either or both legs $Tg'''$ and $Ts'''$ may, for starting and control purposes, be connected to a steam supply (not shown). In this connection, the lower or joining portions of the legs $Tg'''$ and $Ts'''$ may be provided with conduits 252 and control valves 254 for injecting steam into the brine-oil mixture $M_0$. An additional steam injection may be made below the grid structure and sheets 500 and 518 just prior to the region of boiling at $B_1$.

Additional or alternative control of the process may be effected by feeding steam from the outlet 508 of the evaporator of one stage to the leg $Tg'''$ of the next stage or a later stage. For this purpose, the apparatus includes an interconnecting conduit 256 and a regulating valve 258.

It is to be understood as indicated above that the values set forth above are based on preliminary calculations given merely to illustrate the principles of the invention, and are not necessarily exact nor required to utilize successfully the various features of the invention described. It is to be further understood that the embodiments described are purely for purposes of example, and that many other variations, modifications and applications of the invention, or the several features thereof disclosed, may be made.

What is claimed is:

1. A system for flash distillation of a liquid mixture including saline water and an immiscible liquid having both a different density and a lower vapor pressure wherein the liquids are intimately mixed and continuously remixed during passage through each of the hereinafter defined evaporator stages and U-tube connecting means so that heat transfer is maintained between the immiscible liquid and saline water droplets accompanying flashing of said droplets, said system comprising a plurality of evaporator stages, each stage including an evaporator chamber displaying internal temperature and pressure characteristics of decreasing magnitude from the first stage through the last stage, U-tube connecting means connecting consecutive evaporator chambers of said stages thereby to permit flow of the intimately mixed liquids through the connections in a manner such that the liquids will flow with turbulence and at a velocity to maintain the intimate mixing of the same within the connecting means, said U-tube connecting means each including a first leg in fluid communication with and forming a portion of one of said stages for passing the mixed liquids out of said evaporator chamber and a second leg in fluid communication with and forming a portion of a successive stage for passing the mixed fluid flow into said successive evaporator chamber, a plurality of mixing baffle means spaced apart and stacked within each chamber to intercept the downward gravitational flow of the mixed liquids through the chamber and into said first leg, said baffle means extending across a major portion of the cross-section of the chamber of each stage between the exit of said second leg and the entrance to the first leg of the next successive U-tube connecting means, said baffle means providing continuous intermixing of the liquids accompanying flashing of the saline droplets during said gravitational flow thereby to insure continuous transfer of heat from said immiscible liquid to the unevaporated saline liquid to permit further flashing from said heated saline liquid, said intermixing means carried by each tray being out of vertical alignment with the intermixing means in adjacent trays, and means in fluid connection with the chamber of said evaporator stages to allow discharge of pure water-vapour.

2. The system of claim 1 wherein said baffle means reside within a region of approximately ¼ to about ¾ of the total height of said evaporator and said flow of mixed liquids into said evaporator is above the baffle means.

3. The system of claim 1 including a length of increased cross-sectional area at the terminus of said second leg for increasing the boiling and driving capacity of the saline droplets in the liquid mixture within said area prior to discharge of the boiling saline droplets into said successive evaporator chamber, and means within said increased cross-sectional area to provide increased surface area to support the mixed boiling liquids.

4. The system of claim 3, wherein said supporting means is in the form of a grid providing a multiplicity of substantially vertical rectangular conduits.

5. The system of claim 1, wherein the connection between the evaporator chamber and the entrance to said first leg is of a cross-section greater than the cross-section of said first leg thereby to eliminate holdup of the liquid mixture within said first leg.

6. The system of claim 5, wherein said increased cross-sectional area at the entrance to said first leg is conical in form thereby to collect the mixed liquids and pass the same into said first leg.

7. The system of claim 1, wherein the plurality of baffle means are stacked in superposed horizontal relation one to the other and wherein said intermixing means is formed by a multiplicity of uniformly arranged perforations.

8. The system of claim 7, wherein said perforations in adjacent baffle means are out of vertical alignment.

9. The system of claim 7, wherein said perforated baffle means reside within a region of approximately ¼ to about ¾ of the total height of said evaporator and said flow of mixed liquids into said evaporator is above the baffle means.

10. A process of distilling a solvent from a solution containing solutes dissolved therein comprising, mixing the solution with a quantity of an immiscible liquid having a different density and a lower vapour pressure than the solvent, vapourising a quantity of the solvent from the mixture while the immiscible liquid remains in the liquid state, thereby cooling the resultant mixture, separating the cooled immiscible liquid from the cooled residual solution, reheating the immiscible liquid by causing same to flow down by gravity through a series of condensers disposed at decreasing elevations as solvent evaporated from the solution is condensed on the immiscible liquid, the condensers displaying increasing temperature and pressure conditions with decreasing elevation, and separating the immiscible liquid from the condensed solvent exiting from the condensers.

11. A process according to claim 10, wherein pure water is vapourised until substantially all of the $CaCO_3$ and most of the $CaSO_4$ is precipitated with the remaining $CaSO_4$ being in super-saturated solution; the precipitated $CaCO_2$ and $CaSO_4$ is separated; more pure water is vaporised until the salt concentration of the saline water reaches a point where most of the NaCl precipitates, a part of the $CaSO_4$ in super-saturated solution going into a fine suspension; the precipitated NaCl is separated; more pure water is vapourised until the salt concentration of the saline water reaches a point where there precipitate most of the remaining NaCl, part of the $MgSO_4$, and most of the KCl with a part of the $MgCl_2$ in the form of carnallite, part of the CaSO₄ still being in fine suspension and the remaining still being in super-saturated solution; the precipitated salts are separated; the resultant mixture is thereafter fed to a settling tank where the super-saturated CaSO₄ is given time to precipitate and to settle together with the suspended CaSO₄; and the settled CaSO₄, the immiscible liquid, and the concentration brine residue are separately recovered.

12. The process of claim 10, where in the vapourising of the solvent from the mixture is carried out until the major part of the solute precipitates from the mixture, the precipitated solute also being separated from the mixture.

13. A process of extracting salts from saline water by distillation, characterised in: distilling the saline water through a first cycle including the steps of mixing the saline water before distillation with a quantity of a heated immiscible liquid having a different density and a lower vapour pressure than the saline water, vapourising a quantity of pure water from the mixture while said immiscible liquid remains in the liquid state, thereby cooling the resultant mixture, and separating the cooled immiscible liquid from the cooled residual saline water; the cooled residual saline water thereby having a higher salt concentration than the original feed saline water; further increasing the salt concentration of only said residual saline water by repeating said cycle at least one additional time with said residual saline water by mixing same with heated immiscible liquid and vapourising another quantity of pure water from the mixture; and separating from the latter mixture the precipitated salt and immiscible liquid.

14. The process of claim 13, wherein said vapourisation of the pure water from the mixture is carried out until the major part of the salt precipitates from the mixture, the precipitated salt also being separated from the mixture.

15. The process as defined in claim 14, wherein in each of said distilling cycles, said immiscible liquid is reheated by causing same to flow down by gravity through a series of condensers disposed at decreasing elevations as water vapour evaporated from the saline water is condensed on the immiscible liquid, said condensers displaying increasing temperature and pressure conditions with decreasing elevation, the condensed water being separated from the immiscible liquid exiting from the condensers before the immiscible liquid is mixed with the saline water.

16. The process as defined in claim 15, wherein in at least said first-mentioned distilling cycle, the saline water is preheated before being mixed with the hot immiscible liquid by passing the saline water through a heat-exchanger in heat-exchanger relationship with a portion of the hot immiscible liquid separated from the condensed pure water exiting from the condensers, said portion of immiscible liquid being subsequently introduced into said condensers for reheating.

17. The process as defined in claim 15, wherein in at least said first-mentioned distilling cycle the saline water is preheated, before being mixed with the hot immiscible liquid, by evaporating water vapour from a part of the mixture of pure water and immiscible liquid exiting from the condensers and condensing same on the saline water.

18. A system for extracting salts from saline water by distillation, comprising; a first distillation apparatus including means for mixing the feed saline water with an immiscible liquid having a different density and a lower vapour pressure than the saline water, means for evaporating pure water vapour from said mixture, means for separating the immiscible liquid from the residual saline water, and a discharge pipe for discharging the residual saline water, the latter having a salt concentration higher than the original feed water; at least one additional distillation apparatus for further increasing said salt concentration and comprising an inlet pipe connected to said discharge pipe and feeding into said additional distillation apparatus all the residual saline water from said first distillation apparatus, means for mixing same with another quantity of immiscible liquid, and means for evaporating another quantity of pure water vapour therefrom until the residual saline water reaches a concentration wherein a substantial quantity of the salt precipitates; and means for separating from the resulting mixture the precipitated salt and the immiscible liquid.

19. The system as defined in claim 18, wherein each of said distillation apparatuses includes a series of condensers disposed at decreasing elevations and maintained at increasing temperature and pressure conditions, means for directing the immiscible liquid of the respective distillation apparatus to flow downwardly by gravity through said condensers, means for directing the evaporated pure water vapour of the respective distillation apparatus onto said immiscible liquid as the latter flows downwardly through said condensers for heating said immiscible liquid, and a separator for separating the condensed water from said immiscible liquid before the latter is mixed with the saline water in its respective distillation apparatus.

20. The system as defined in claim 19, wherein each of said distillation apparatuses includes a plurality of evaporator chambers displaying internal temperature and pressure characteristics of decreasing magnitude from the first through the last stage, U-tube connecting means connecting consecutive evaporator chambers of said stages to permit flow of the mixture of saline water and immiscible liquid through said evaporator chambers in succession, said U-tube connecting means each including a first leg in fluid communication with and forming a portion of one of said stages for passing the mixed liquids out of said evaporator chamber, and a second leg in fluid communication with and forming a portion of a successive stage for passing the mixed fluid flow into said successive evaporator chamber, said first leg forming therein a down slowing liquid column, and said second leg forming therein an upflowing boiling mixture column, the cross-sectional area of said second leg at the upper end thereof being larger than the cross-sectional area of said first leg in at least some of the evaporator stages.

21. The system of claim 19, wherein in at least some of the evaporator stages, said second leg includes a plurality of vertical elements to support the up-flowing boiling mixture column against collapse.

References Cited
UNITED STATES PATENTS

| | | | |
|---|---|---|---|
| 411,012 | 9/1889 | Chapman | 159—17 |
| 1,071,341 | 8/1913 | Prache | 159—26 I |
| 3,232,847 | 2/1966 | Hoff | 203—11 |
| 3,248,181 | 4/1966 | Akimoto | 23—300 |
| 3,249,517 | 5/1966 | Lockman | 159—18 |
| 3,298,932 | 1/1967 | Bauer | 203—11 |
| 3,337,421 | 8/1967 | El-Roy | 203—11 |
| 3,446,711 | 5/1969 | Rosenstein et al. | 202—234 |
| 3,483,093 | 12/1969 | Walker et al. | 203—11 |
| 3,505,111 | 4/1970 | Malek | 177—16 |

NORMAN YUDKOFF, Primary Examiner

J. SOFER, Assistant Examiner

U.S. Cl. X.R.

159—2 MS, 18, 45, Dig. 17; 202—185 A, 186, 234; 203—7, 10, 11, 48, 100 DG